(12) United States Patent
Lerchenmueller et al.

(10) Patent No.: US 12,738,699 B2
(45) Date of Patent: Sep. 15, 2026

(54) DRIVE DEVICE, PRESSURE GENERATOR FOR A BRAKE SYSTEM

(71) Applicant: Robert Bosch GmbH, Stuttgart (DE)

(72) Inventors: Klaus Lerchenmueller, Rettenberg (DE); Lothar Detels, Burgberg (DE)

(73) Assignee: Robert Bosch GmbH, Stuttgart (DE)

( * ) Notice: Subject to any disclaimer, the term of this patent is extended or adjusted under 35 U.S.C. 154(b) by 242 days.

(21) Appl. No.: 18/557,418

(22) PCT Filed: Aug. 17, 2022

(86) PCT No.: PCT/EP2022/072890
§ 371 (c)(1),
(2) Date: Oct. 26, 2023

(87) PCT Pub. No.: WO2023/021053
PCT Pub. Date: Feb. 23, 2023

(65) Prior Publication Data

US 2024/0275108 A1 Aug. 15, 2024

(30) Foreign Application Priority Data

Aug. 19, 2021 (DE) ..................... 10 2021 209 119.9

(51) Int. Cl.
*H01R 13/66* (2006.01)
*B60T 13/74* (2006.01)
*H01R 4/242* (2018.01)

(52) U.S. Cl.
CPC .......... *H01R 13/665* (2013.01); *B60T 13/745* (2013.01); *H01R 4/242* (2013.01); *H01R 2201/26* (2013.01)

(58) Field of Classification Search
CPC .. H01R 13/665; H01R 4/242; H01R 2201/26; B60T 13/745
(Continued)

(56) References Cited

U.S. PATENT DOCUMENTS 1,994,886 A * 3/1935 Doane ..................... F21V 21/12 439/162
2,607,863 A * 8/1952 Macfarland .......... H02G 11/003 439/162
(Continued)

FOREIGN PATENT DOCUMENTS

CN 208210414 U 12/2018
DE 102005004209 A1 8/2006
(Continued)

OTHER PUBLICATIONS

International Search Report for PCT/EP2022/072890, Issued Nov. 25, 2022.

*Primary Examiner* — Gary F Paumen
(74) *Attorney, Agent, or Firm* — Norton Rose Fulbright US LLP

(57) ABSTRACT

A drive device. The drive device includes an electric machine arranged in a housing, a sensor unit which has at least one circuit board and is designed to detect a rotational position of a rotor of the electric machine, and a rod-shaped contact apparatus which has at least one conductor which is electrically connected to the circuit board and is or can be electrically connected to a controller. The conductor is electrically connected to the circuit board by a plug-in connection.

12 Claims, 3 Drawing Sheets

(58) Field of Classification Search
USPC .................................... 439/32, 33, 660, 162
See application file for complete search history.

(56) References Cited

U.S. PATENT DOCUMENTS

| | | | | |
|---|---|---|---|---|
| 6,004,138 | A * | 12/1999 | Harbertson .......... | H01R 25/145 439/32 |
| 6,488,511 | B1 * | 12/2002 | Stewart .................. | B25F 5/021 30/296.1 |
| 7,703,862 | B2 | 4/2010 | Abe et al. | |
| 8,801,455 | B2 * | 8/2014 | Carreras Garcia .......................... | H01R 13/6588 439/417 |
| 11,096,268 | B2 * | 8/2021 | Goatley ................. | H05K 7/209 |
| 2015/0333600 | A1 | 11/2015 | Nakano et al. | |
| 2020/0037432 | A1 | 1/2020 | Goatley et al. | |
| 2021/0175781 | A1 | 6/2021 | Furukawa et al. | |

FOREIGN PATENT DOCUMENTS

| | | | |
|---|---|---|---|
| DE | 202010007229 | U1 | 10/2010 |
| DE | 102009020662 | A1 | 11/2010 |
| DE | 102011089047 | A1 | 6/2012 |
| DE | 202012007216 | U1 | 8/2012 |
| DE | 102015100661 | A1 | 7/2016 |
| DE | 202018107037 | U1 | 3/2019 |
| WO | 2020127858 | A1 | 6/2020 |

* cited by examiner

DRIVE DEVICE, PRESSURE GENERATOR FOR A BRAKE SYSTEM

FIELD

The present invention relates to a drive device comprising an electric machine arranged in a housing, comprising a sensor unit which has at least one circuit board and is configured to detect a rotational position of a rotor of the electric machine, and comprising a rod-shaped contact apparatus which has at least one conductor which is electrically connected to the circuit board and is or can be electrically connected to a controller.

The present invention also relates to a pressure generator for a brake system comprising such a drive device.

BACKGROUND INFORMATION

Drive devices of the general type mentioned above are described in the related art. In the case of a drive device with an electric machine, the electric machine is typically arranged in a housing of the drive device. The machine generally has a rotatably mounted rotor and a stator fixed to the housing with an in particular multiphase motor winding. The motor winding is preferably arranged so as to be distributed around the rotor in such a way that the rotor is rotatable by a suitable energization of the motor winding. As a rule, the electric machine is controlled as a function of a rotational position of the rotor. A sensor unit associated with the rotor is typically present, which sensor unit has at least one sensor element and is designed to detect a rotational position of the rotor of the electric machine by means of the sensor element. The sensor unit often has at least one circuit board, wherein the circuit board is usually arranged fixed to the housing. Some conventional drive devices have a rod-shaped contact apparatus for the electrical connection of the sensor unit to a controller. Typically, the rod-shaped contact apparatus has at least one conductor which is electrically connected to the circuit board and is or can be electrically connected to the controller. It is conventional in the related art to provide the electrical connection between the circuit board and the conductor by means of a contact disk soldered onto the circuit board on the one hand, and a conductor-side contact spring on the other hand. A free end of the contact spring contacts an end face of the contact disk.

SUMMARY

In a drive device according to an example embodiment of the present invention, the conductor is electrically connected to the circuit board by a plug-in connection. A plug-in connection is formed by inserting a plug-in connector into a plug-in connector socket. When the plug-in connector is plugged into the plug-in connector socket, the plug-in connector is electrically connected to the plug-in connector socket by multi-zone contacting and is fastened in the plug-in connector socket by a friction-locking connection. Correspondingly, the plug-in connection according to the present invention provides mechanically robust electrical contact between the conductor of the contact apparatus and the circuit board. Compared to the aforementioned electrical connection, which provides a soldered-on contact disk and a contact spring, the plug-in connection according to the present invention therefore reduces the probability of a loss of contact. In addition, the radial installation space necessary to form a plug-in connection is small compared to the aforementioned electrical connection, which provides a soldered-on contact disk and a contact spring. According to an example embodiment of the present invention, the contact apparatus preferably has a plurality of conductors which are electrically connected to the circuit board by an in each case different plug-in connection. Because the radial installation space required for the formation of the plug connections is small, the grid dimension of the plug connections can be reduced in comparison with electrical connections from the related art. It follows from this that the radial extent, for example, of the elongate contact apparatus can be reduced. The conductors preferably together form a cable, wherein the cable is particularly preferably designed as a ribbon cable.

According to a preferred embodiment of the present invention, the circuit board has a connecting pin, and a contact socket electrically connected to the conductor is plugged onto the connecting pin in order to form the plug-in connection. Equipping the circuit board with the connecting pin can be carried out technically easily. The connecting pin preferably has a first contact section assigned to the circuit board and a second contact section inserted into the contact socket. The second contact section is preferably oriented perpendicular to the circuit board. The first contact section is preferably soldered to the circuit board or pressed into a press-in opening of the circuit board. If the second contact section is soldered to the circuit board, the first and the second contact sections will preferably be aligned perpendicular to one another. If the second contact section is pressed into the press-in opening of the circuit board, the first and the second contact sections will preferably be aligned parallel to one another. If a plurality of conductors are present which are electrically connected to the circuit board by an in each case different plug-in connection, the circuit board will preferably have a number of connecting pins corresponding to the number of conductors. According to an alternative embodiment, the circuit board preferably has a contact socket, and a connecting pin electrically connected to the conductor is preferably inserted into the contact socket in order to form the plug-in connection.

According to an example embodiment of the present invention, the contact socket is preferably electrically connected to the conductor by an insulation displacement connection. If two elements are electrically connected to one another by an insulation displacement connection, the insulation displacement connection will also effect a form-fitting and/or frictional fastening of the elements to one another in addition to the electrical connection. Accordingly, a mechanically robust electrical contact between the contact socket and the conductor is provided by the insulation displacement connection.

According to a preferred embodiment of the present invention, the circuit board has a pin carrier carrying the connecting pin. The pin carrier is preferably made of plastics material. If the circuit board has a plurality of connecting pins, the connecting pins will preferably be carried by the same pin carrier. As a result, the connecting pins can be easily handled together, whereby, for example, equipping the circuit board with the connecting pins is simplified. According to a preferred embodiment, it is provided that the contact apparatus has a socket carrier carrying the contact socket. The socket carrier is preferably made of plastics material. If the contact apparatus has a plurality of conductors, the contact sockets electrically connected to the conductors will preferably be carried by the same socket carrier.

According to a preferred embodiment of the present invention, the drive device has a socket carrier guide arranged on the circuit board, the socket carrier guide being formed integrally with the pin carrier. The socket carrier guide ensures a desired alignment of the contact socket when it is being plugged together with the connecting pin, so that the contact socket is brought up to the connecting pin as intended. The design of the plug-in connection is thus simplified by the socket carrier guide. The socket carrier guide preferably encloses the second contact section of the connecting pin radially, at least in some regions. The socket carrier guide is preferably sleeve-shaped. If the socket carrier guide and the pin carrier are integrally formed with one another, the number of individual parts of the drive device will be reduced.

According to an alternative embodiment of the present invention, the socket carrier guide is preferably formed separately from the pin carrier. The structure of the pin carrier is thereby simplified. In particular, a commercially available pin carrier can be used, whereby costs can be saved.

According to a preferred embodiment of the present invention, the contact apparatus has a rod-shaped conductor carrier, the conductor extending through the conductor carrier or along the conductor carrier. If the conductor extends through the conductor carrier, the conductor will be protected from external influences by the conductor carrier. The conductor carrier is preferably made of plastics material. The conductor carrier preferably carries the conductor. However, the conductor can also extend through the conductor carrier or along the conductor carrier without the conductor carrier being subjected to the weight of the conductor. The conductor carrier is preferably sleeve-shaped.

According to a preferred embodiment of the present invention, the socket carrier is formed separately from the conductor carrier and is connected to the conductor carrier by a form-fitting connection. The assembly of the contact apparatus is simplified by the socket carrier being formed separate from the conductor carrier. For example, during assembly, the contact socket is first electrically connected to the conductor by the above-mentioned insulation displacement connection. Only then is the socket carrier connected to the conductor carrier by the form-fitting connection. The form-fitting connection is preferably designed in such a way that the socket carrier is connected to the conductor carrier in a rotationally fixed manner. A rotation of the socket carrier relative to the conductor carrier would impede the formation of the plug-in connection. The conductor carrier preferably has a holding structure which interacts with a holding structure of the socket carrier in order to form the form-fitting connection. The conductor carrier preferably has, as a holding structure, at least one retaining slot extending in the axial direction or at least one retaining groove extending in the axial direction, wherein the socket carrier has at least one radial projection as a holding structure, which radial projection radially engages in the retaining slot or the retaining groove in order to form the form-fitting connection.

According to a preferred embodiment of the present invention, the conductor carrier has a first axial segment assigned to the circuit board and a second axial segment assigned to the controller, the first and the second axial segments being guided by a linear guide in an axially displaceable manner relative to one another. Because the axial segments are axially displaceable relative to one another, manufacturing-related tolerances with respect to the axial distance between the circuit board and the controller can be compensated for by the conductor carrier. Because the axial segments are guided in an axially displaceable manner by a linear guide, a rotation of the axial segments relative to one another is blocked. Such a rotation would impede the formation of the plug-in connection. The first axial segment preferably has a guide structure which interacts with a guide structure of the second axial segment to form the linear guide. Particularly preferably, the linear guide is designed as a claw coupling or like a claw coupling. However, the linear guide can also be designed differently. If the linear guide is designed as a claw coupling or like a claw coupling, the first axial segment will preferably have as a guide structure a plurality of guide projections which project in the direction of the second axial segment and are arranged at a distance from the first axial segment in the circumferential direction of the conductor carrier. The second axial segment will then have a plurality of guide projections which project in the direction of the first axial segment and arranged at a distance from the second axial segment in the circumferential direction of the conductor carrier. In this case, the guide projections of the axial segments engage with one another to form the linear guide. A guide projection of the second axial segment thus always follows a guide projection of the first axial segment in the circumferential direction of the conductor carrier. The guide projections preferably have a cross-section shaped like an annular segment. Particularly preferably, the first axial segment and the second axial segment each have two guide projections with a cross-section shaped like an annular segment, wherein the guide projections each extend in the circumferential direction over an angular interval of 90°.

According to an example embodiment of the present invention, the first and the second axial segments are preferably of identical design. This results in the advantage that the number of different individual parts is reduced. The costs for production of the conductor carrier can thereby be reduced.

According to an example embodiment of the present invention, the conductor carrier preferably has a spring element which acts between the first axial segment and the second axial segment. The spring element is preferably fastened to the first axial segment and to the second axial segment, so that the axial segments are held against one another by the spring element at least before the conductor carrier is installed in the drive device. When the conductor carrier is installed in the drive device as intended, the spring element is preferably held under pretension between the first axial segment and the second axial segment. This results in the advantage that the mechanical robustness of the plug-in connection according to the present invention is further increased, because the spring element acts on the first axial segment with an axial force acting in the direction of the circuit board. The spring element preferably radially encloses the aforementioned linear guide.

According to a preferred embodiment of the present invention, the conductor is electrically connected to the controller by a further plug-in connection. This results in the advantages that have already been explained in connection with the plug-in connection acting between the conductor and the circuit board. The plug-in connection and the further plug-in connection are preferably of identical design. The plug-in connection and the further plug-in connection are thus provided by identical individual parts. The number of different individual parts can thereby be reduced, whereby costs can be saved.

A pressure generator according to an example embodiment of the present invention for a brake system has a pump device, a drive device for actuating the pump device, and a controller for controlling the drive device. The pressure generator includes the drive device according to the present invention. This also results in the advantages already mentioned. Further preferred features and combinations of features result from what was described above and from the disclosure herein.

The present invention is explained in more detail below with reference to the figures.

DETAILED DESCRIPTION OF EXAMPLE EMBODIMENTS

Figure 1:
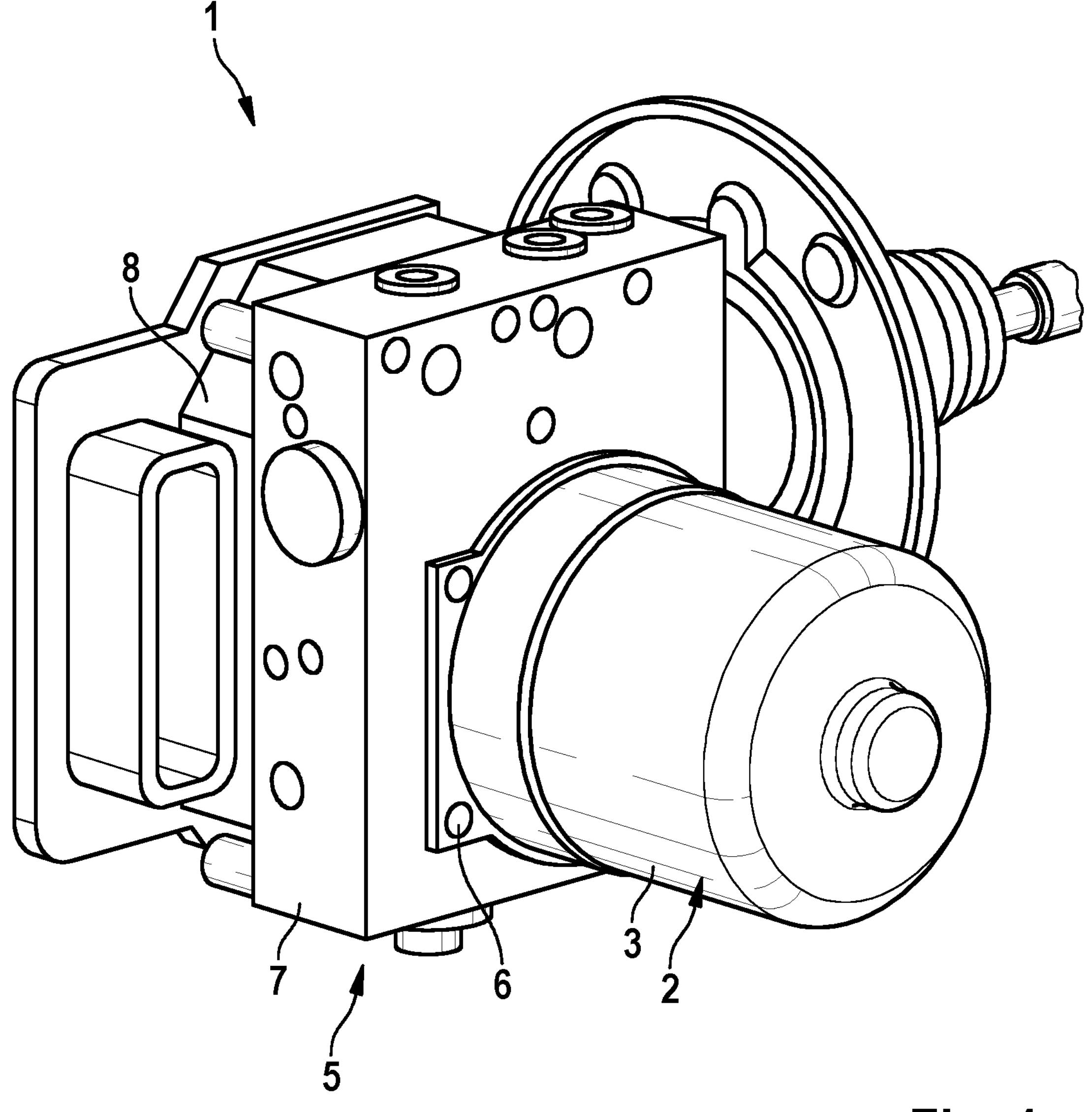
FIG. 1 shows a perspective view of a pressure generator for a brake system, according to an example embodiment of the present invention.

FIG. 1 shows a perspective representation of a pressure generator 1 for a hydraulic brake system of a motor vehicle. The pressure generator 1 comprises an electric machine 2. The drive device 2 comprises a housing 3, which in the present case has a circular cross-section.

An electric machine (not visible) of the drive device 2 is arranged in the housing 3. The electric machine has a rotatably mounted rotor and a stator fixed to the housing and having a multiphase motor winding. As a working machine, the pressure generator 1 comprises a pump device 5 with at least one fluid pump. The housing 3 of the drive device 2 is fastened to a housing 7 of the pump device 5 by a plurality of fastening means 6. The drive device 2 is designed to operate the at least one fluid pump of the pump device 5 by means of the electric machine. For this purpose, the rotor of the electric machine is arranged in a rotationally fixed manner on a drive shaft of the drive device 2 which is rotatably mounted in the housing 3. The drive shaft is operatively connected to the fluid pump by a transmission device such as a planetary gearing. For mounting the drive shaft, the drive device 2 preferably has a bearing shield (not visible). The bearing shield is assigned to the electric machine and covers the electric machine. In this respect, the bearing shield forms a type of housing cover of the housing. The pressure generator 1 also has a control device 8 for controlling the electric machine. The pump device 5 is arranged between the electric motor 2 on one side and the controller 8 on the other side.

The drive device 2 has a sensor unit which is assigned to the rotor of the electric machine. The sensor unit is arranged in the housing 3, the sensor unit thus not being visible either. The sensor unit is preferably arranged in the housing 3 on a side of the bearing shield facing the electric machine. The sensor unit has at least one sensor element and is designed to detect a rotational position of the rotor of the electric machine by means of the sensor element.

A circuit board 9 of the controller 8 is electrically connected to a circuit board 11 of the sensor unit by a rod-shaped contact apparatus 10. When the drive device 2 is installed in the pressure generator 1 as shown in FIG. 1, the rod-shaped contact apparatus 10 extends through an opening in the housing 7 of the pump device 5. When the sensor unit is arranged on the side of the end shield facing the machine, the rod-shaped contact apparatus 10 preferably also extends through an opening of the bearing plate. According to an exemplary embodiment of the sensor unit, the circuit board 11 is designed as a sensor circuit board 11. The circuit board 11 that is electrically connected to the contact apparatus 10 thus comprises the aforementioned sensor element. In particular, in this exemplary embodiment, the sensor unit has only the circuit board 11 as a circuit board. According to a further exemplary embodiment of the sensor unit, the circuit board 11 is a circuit board 11 which is present in addition to the sensor circuit board and is electrically connected to the sensor circuit board. In this exemplary embodiment, the sensor unit thus has at least two circuit boards, namely the sensor circuit board and the circuit board 11.

Figure 2:
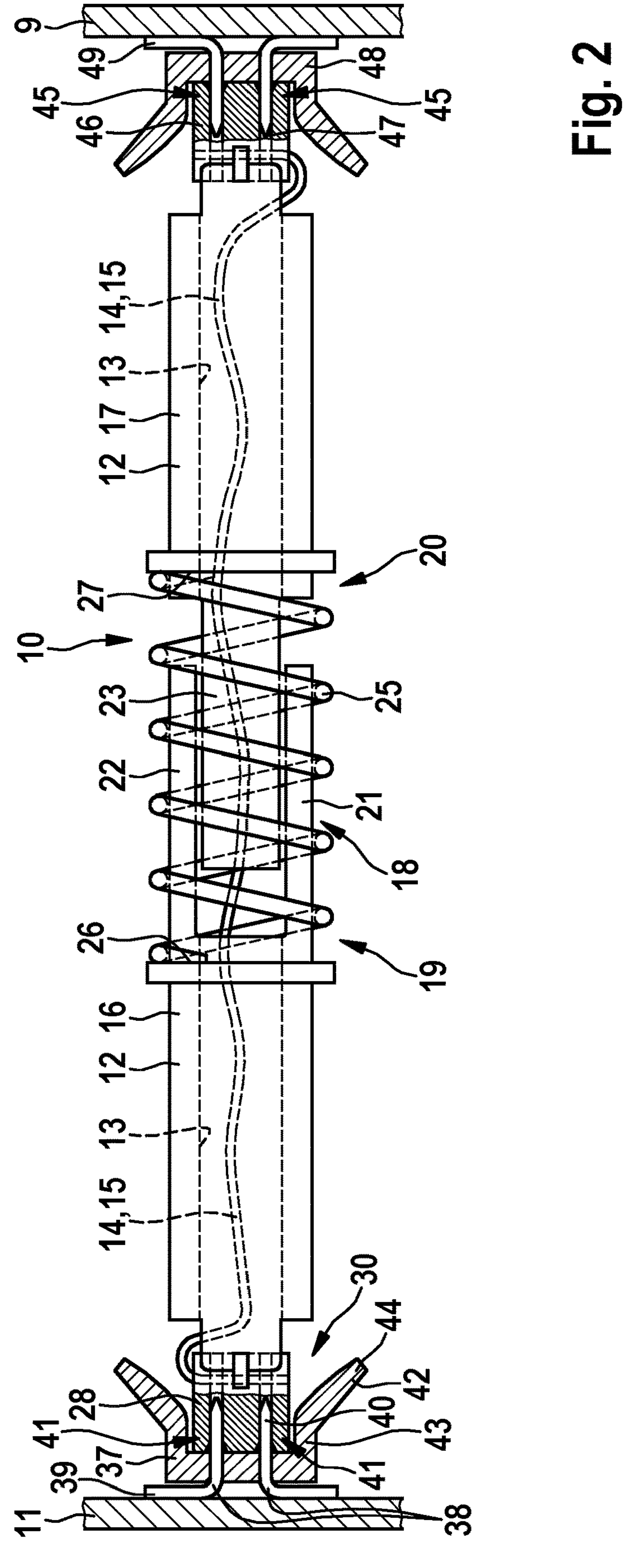
FIG. 2 shows a contact apparatus of a drive device of the pressure generator, according to an example embodiment of the present invention.

The design of the contact apparatus 10 is explained in more detail below. For this purpose, FIG. 2 shows a side view of the contact apparatus 10. The contact apparatus 10 has a rod-shaped conductor carrier 12 made of plastics material. The conductor carrier 12 has a continuous axial passage 13 and is thus designed in the shape of a sleeve. A cable 14, which has a plurality of electrically conductive conductors 15, extends through the conductor carrier 12 or the axial passage 13. In the present case, the cable 14 is designed as a ribbon cable. The conductor carrier 12 has a first axial segment 16 and a second axial segment 17. In the present case, the axial segments 16 and 17 are of identical design.

Figure 3:
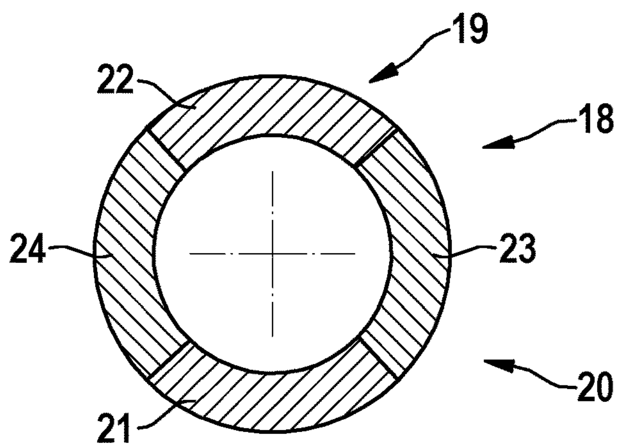
FIG. 3 shows a sectional view of the contact apparatus, according to an example embodiment of the present invention.

The axial segments 16 and 17 are guided by a linear guide 18 in an axially displaceable manner relative to one another. The axial length of the conductor carrier 12 can thus be changed by displacing the axial segments 16 and 17. On the other hand, a rotation of the axial segments 16 and 17 relative to one another is blocked by the linear guide 18. FIG. 3 shows a sectional view of the conductor carrier 12 in the region of the linear guide 18. The first axial segment 16 has a guide structure 19 which interacts with a guide structure 20 of the second axial segment 17 to form the linear guide 18. The first axial segment 16 as guide structure 19 has two guide projections 21 and 22, which project in the direction of the second axial segment 17. As can be seen from FIG. 3, the guide projections 21 and 22 each have a cross-section in the shape of an annular segment. In the present case, the guide projections 21 and 22 extend in the circumferential direction of the conductor carrier 12 over an angular interval of 90° and lie radially opposite one another. As mentioned above, the first axial segment 16 and the second axial segment 17 are of identical design. Correspondingly, the second axial segment 17 as guide structure 20 has two guide projections 23 and 24, which guide projections project in the direction of the first axial segment 16. The guide projections 21, 22, 23 and 24 of the axial segments 16 and 17 engage with one another to form the linear guide 18. Viewed in the circumferential direction of the conductor carrier 12, a guide projection 23 or 24 of the second axial segment 17 thus always follows a guide projection 21 or 22 of the first axial segment 16.

The contact apparatus 10 also has a spring element 25 which acts between the axial segments 16 and 17. In the present case, the spring element 25 is designed as a spiral spring 25. At one end the spring element 25 axially abuts a circumferential axial stop 26 of the first axial segment 16 and at the other end abuts a circumferential axial stop 27 of the second axial segment 17 axially opposite the axial stop 26. The spring element 25 radially encloses the linear guide 18.

Figure 4:
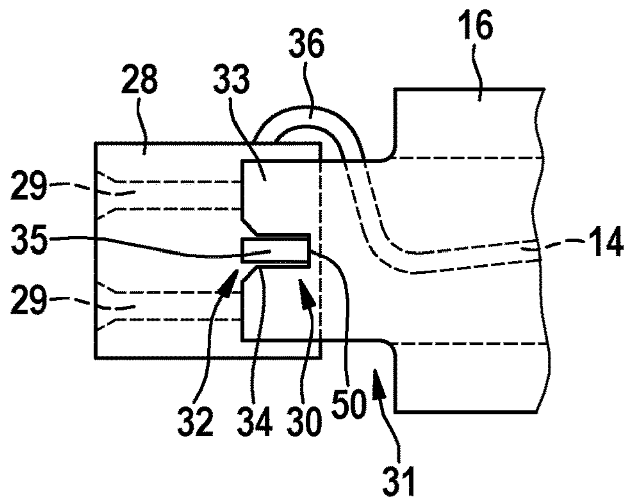
FIG. 4 shows a detailed view of the contact apparatus, according to an example embodiment of the present invention.
Figure 5:
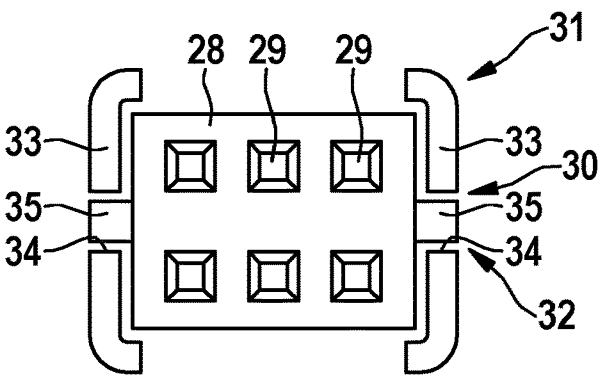
FIG. 5 shows a front view of the contact apparatus, according to an example embodiment of the present invention.

The electrical connection of the conductors 15 to the circuit board 11 is explained in more detail below. For this purpose, the contact apparatus 10 has a socket carrier 28 made of plastics material with a plurality of electrically conductive contact sockets 29. FIG. 4 shows a detailed view of the contact apparatus 10 in the region of the socket carrier 28. FIG. 5 shows a front view of the socket carrier 28. The number of contact sockets 29 corresponds to the number of conductors 15 in the cable 14. As can be seen from FIG. 5, in the present case there are six contact sockets 29 and thus six conductors 15. In the present case, the contact sockets 29 are arranged in two rows of three contact sockets 29. A first end 36 of the cable 14 assigned to the circuit board 11 projects out of the first axial segment 16 and into the socket carrier 28. Each of the conductors 15 is electrically connected to an in each case different contact socket 29 of the socket carrier 28. In the present case, the conductors 15 are electrically connected to the corresponding contact socket 29 by an in each case different insulation displacement connection. The socket carrier 28 is formed separately from the first axial segment 16 and is connected to the first axial segment 16 by a form-fitting connection 30. The first axial segment 16 has a holding structure 31 which interacts with a holding structure 32 of the socket carrier 28 to form the form-fitting connection 30.

The form-fitting connection 30 is designed in such a way that the socket carrier 28 is connected to the first axial segment 16 in a rotationally fixed manner. In the present case, the first axial segment 16 as holding structure 31 has two axially projecting retaining projections 33, which each have a retaining slot 34 extending in the axial direction. The socket carrier 28 as holding structure 32 has two radial projections 35. The socket carrier 28 is plugged onto the first axial segment 16 in such a way that the retaining projections 33 enclose the socket carrier 28 and the radial projections 35 engage radially in the retaining slots 34. The radial projections 35 axially abut a bottom 50 of the retaining slots 34.

The circuit board 11 has a pin carrier 37 made of plastics material with a plurality of electrically conductive connecting pins 38. The number of connecting pins 38 corresponds to the number of contact sockets 29 and thus to the number of conductors 15 in the cable 14. The connecting pins 38 each have a first contact section 39 assigned to the circuit board 11 and a second contact section 40 assigned to the contact apparatus 10. As can be seen from FIG. 2, the connecting pins 38 are designed to be angled in such a way that the first contact section 39 of a connecting pin 38 is oriented perpendicular to the second contact section 40 of the same connecting pin 38. The connecting pins 38 are electrically connected to the circuit board 11 by the first contact section 39. In the present case, the first contact sections 39 are soldered to the circuit board 11. The connecting pins 38 are electrically connected to the conductors 15 in the cable 14 by the second contact sections 40. As can be seen from FIG. 2, each of the connecting pins 38 is plugged into an in each case different contact socket 29. Correspondingly, the conductors 14 are electrically connected to the circuit board 11 by an in each case different plug-in connection 41 by means of the contact sockets 29 and the connecting pins 38.

The drive device 2 also has a socket carrier guide 42 arranged on the circuit board 11. The socket carrier guide 42 is assigned to the second contact sections 40 of the connecting pins 38 and encloses the second contact sections 40 radially at least in some regions. The socket carrier guide 42 ensures a desired alignment of the socket carrier 28 or of the contact sockets 29 when they are being plugged together with the connecting pins 38. The socket carrier guide 42 has a sleeve-shaped first axial section 43 which is assigned to the circuit board 11. The first axial section 43 is designed to match the shape of the socket carrier 28 in such a way that the socket carrier 28 can be inserted into the first axial section 43 at least substantially free of play. A second axial section 44 adjoins the first axial section 43. Starting from the first axial section 43, the second axial section 44 widens and thereby forms a kind of insertion beveling for the socket carrier 28.

According to the exemplary embodiment shown in FIG. 2, the socket carrier guide 42 is formed integrally with the pin carrier 37. According to a further exemplary embodiment, the socket carrier guide 42 is formed separately from the pin carrier 37. The socket carrier guide 42 is then fastened, for example, to the circuit board 11 or to the aforementioned bearing shield.

The connection of the conductors 15 to the circuit board 9 of the controller 8 is structurally identical to the connection of the conductors 15 to the circuit board 11 of the sensor unit. Correspondingly, the conductors 15 are electrically connected to the circuit board 9 of the controller 8 by an in each case further plug-in connection 45. The further plug connections 45 are provided by a further socket carrier 46 with a plurality of further contact sockets 47 and also by a further pin carrier 48 with a plurality of further connecting pins 49, as described above with reference to the connection of the conductors 15 to the circuit board 11 of the sensor unit.

The invention claimed is:

1. A drive device, comprising:

an electric machine arranged in a housing;

a sensor unit which has at least one circuit board and is configured to detect a rotational position of a rotor of the electric machine; and a rod-shaped contact apparatus which has at least one conductor which is electrically connected to the circuit board and is or can be electrically connected to a controller, the conductor is electrically connected to the circuit board by a plug-in connection, wherein:

the contact apparatus includes a rod-shaped conductor carrier, the conductor extending through the conductor carrier or along the conductor carrier, the conductor carrier has a first axial segment associated with the circuit board and a second axial segment associated with the controller, the first and the second axial segments being guided by a linear guide to be axially displaceable relative to one another, and the conductor carrier has a spring element acting between the first axial segment and the second axial segment.

2. The drive device according to claim 1, wherein the circuit board has at least one connecting pin, and a contact socket which is electrically connected to the conductor is plugged onto the connecting pin to form the plug-in connection.

3. The drive device according to claim 2, wherein the contact socket is electrically connected to the conductor by an insulation displacement connection.

4. The drive device according to claim 2, wherein the circuit board has a pin carrier carrying the connecting pin, and/or the contact apparatus has a socket carrier carrying the contact socket.

5. The drive device according to claim 4, further comprising:

a socket carrier guide arranged on the circuit board, the socket carrier guide being formed integrally with the pin carrier.

6. The drive device according to claim 4, further comprising:

a socket carrier guide arranged on the circuit board, the socket carrier guide being formed separately from the pin carrier.

7. The drive device according to claim 5, wherein the socket carrier is formed separately from the conductor carrier and is connected to the conductor carrier by a form-fitting connection.

8. The drive device according to claim 1, wherein the conductor is electrically connected to the controller by a further plug-in connection.

9. A drive device, comprising:

an electric machine arranged in a housing;

a sensor unit which has at least one circuit board and is configured to detect a rotational position of a rotor of the electric machine; and a rod-shaped contact apparatus which has at least one conductor which is electrically connected to the circuit board and is or can be electrically connected to a controller, the conductor is electrically connected to the circuit board by a plug-in connection, wherein:

the contact apparatus includes a rod-shaped conductor carrier, the conductor extending through the conductor carrier or along the conductor carrier, the conductor carrier has a first axial segment associated with the circuit board and a second axial segment associated with the controller, the first and the second axial segments being guided by a linear guide to be axially displaceable relative to one another, and the first and the second axial segments are of identical design.

10. A pressure generator for a brake system, comprising:

a pump device;

a drive device configured to actuate the pump device;

a controller configured to control the drive device, the drive device including:

an electric machine arranged in a housing, a sensor unit which has at least one circuit board and is configured to detect a rotational position of a rotor of the electric machine, and a rod-shaped contact apparatus which has at least one conductor which is electrically connected to the circuit board and is or can be electrically connected to the controller, the conductor is electrically connected to the circuit board by a plug-in connection, wherein:

the contact apparatus includes a rod-shaped conductor carrier, the conductor extending through the conductor carrier or along the conductor carrier, the conductor carrier has a first axial segment associated with the circuit board and a second axial segment associated with the controller, the first and the second axial segments being guided by a linear guide to be axially displaceable relative to one another, and the conductor carrier has a spring element acting between the first axial segment and the second axial segment.

11. A drive device, comprising:

an electric machine arranged in a housing;

a sensor unit which includes at least one printed circuit board and is configured to detect a rotational position of a rotor of the electric machine; and a rod-shaped contact apparatus which includes at least one conductor that is electrically connected to the printed circuit board and is electrically connected or connectable to a printed circuit board of a control unit, characterized in that the contact apparatus comprises a sleeve-shaped conductor carrier, wherein:

the conductor extends through or along the conductor carrier, and the conductor is electrically and mechanically connected, on the one hand, to the printed circuit board of the sensor unit via a plug connection and, on the other hand, to the printed circuit board of the control unit via a further plug connection.

12. A pressure generator for a brake system, comprising:

a pump device;

a drive device configured to actuate the pump device;

a controller configured to control the drive device, the drive device including:

an electric machine arranged in a housing;

a sensor unit which includes at least one printed circuit board and is configured to detect a rotational position of a rotor of the electric machine; and a rod-shaped contact apparatus which includes at least one conductor that is electrically connected to the printed circuit board and is electrically connected or connectable to a printed circuit board of a control unit, characterized in that the contact apparatus comprises a sleeve-shaped conductor carrier, wherein:

the conductor extends through or along the conductor carrier, and the conductor is electrically and mechanically connected, on the one hand, to the printed circuit board of the sensor unit via a plug connection and, on the other hand, to the printed circuit board of the control unit via a further plug connection.

* * * * *